E. A. Wright's Stalk Cutter.
118175 Fig. 1. PATENTED AUG 15 1871
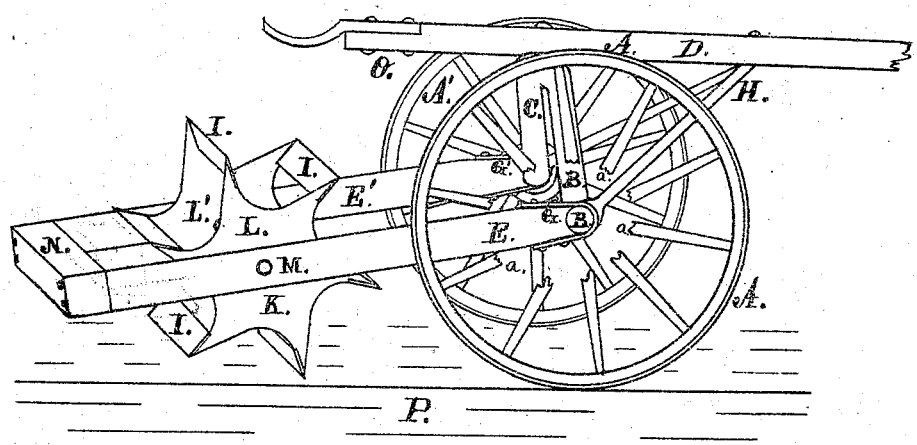
Witnesses:—
L A Games
L Sharp
Inventor:
Edgar Alfred Wright
By S. J. Wallace, Attorney.

UNITED STATES PATENT OFFICE.

EDGAR ALFRED WRIGHT, OF FORT MADISON, IOWA.

IMPROVEMENT IN STALK-CUTTERS.

Specification forming part of Letters Patent No. 118,175, dated August 15, 1871.

*To all whom it may concern:*

Be it known that I, EDGAR ALFRED WRIGHT, of Fort Madison, Iowa, have made a new and useful Improvement in Stalk-Cutters, of which the following is a specification:

The object of this invention is to produce a practical improvement for cutting corn-stalks on the ground before plowing them under in the spring, and to do this in a more economical way than has heretofore been known. In those sections of the country where corn is one of the principal crops, every farmer has or ought to have a two-horse walking-cultivator. The usual and best way of constructing such cultivators is with two wheels connected by an axle, to which axle the beams of the cultivator-plows are attached and follow behind. I propose to construct my stalk-cutter in a similar way, and so to arrange it that the frame which carries the cutting apparatus may be readily unshipped from the axle which connects the wheels aforesaid, and that the cultivators may be attached in its stead. By this means any farmer can supply himself with both a cultivator and a stalk-cutter without being at the expense of purchasing but one set of wheels and its appendages. This, then, is the subject-matter of my invention. I propose to construct the cutting apparatus of my machine in any of the usual forms that are adapted to my purpose, except that it is provided with the means of being readily attached to or removed from the axle that connects the wheels, which axle and wheels are adapted to use as parts of a two-wheel horse cultivator. The best cultivators have an arch or elevation in the middle of the axle so as to allow of its being used after the corn has attained a considerable growth without the liability of its being broken down by the axle. That same form of axle is preferable for the stalk-cutter, as less force will then be needed to bend down the stalks before they are cut; but the stalk-cutter can be attached to the straight axle or one of any other form that will answer for a cultivator.

In the drawing, Figure 1 is a side elevation of the implement with a portion of one wheel removed.

The axle B is raised in the middle, partly for the purpose above mentioned and partly also to hold up the tongue; at least it secures both these objects and also furnishes an elevated support for the cutter when the machine is being removed from place to place, as will be more fully described presently. The frame E may be hinged to this raised axle in its center by a swivel attachment, which will render the machine flexible in turning around, or it may be attached upon each side to the horizontal or to the vertical portion of the axle, as shown in the drawing. This latter is a much more convenient as well as a much cheaper way of constructing the machine; and inasmuch as I have found, by experiment, that no essential inconvenience will result from the rigidity of the implement from that cause, I prefer this mode of attachment. It is also in this manner that the cultivator-beams are usually attached.

Dragging-hooks may be used for drawing the stalks straight, as in other stalk-cutters, in order to be more effectually cut by the machine.

The cutters are horizontal blades I I I firmly mounted on a frame, K, so as to be turned as the frame moves forward and thus cut the stalks into suitable lengths. The tongue D has a part, O, extending backward at a suitable height, on which the rear end of the cutting-frame may be raised, so that the cutters may hang clear from the ground when taken to or from the field.

The rear end of the cutter-frame may be raised and one of the blades I may be turned forward over the part O of the prolongation of the tongue, or a hook or other contrivance may be made for that purpose.

Having thus described my invention, I make the following claim:

The frame E E' N, carrying the cutter K L' I hinged directly to the short arms of the arched axle B C by suitable connections so that the stalk-cutting apparatus may be readily removed and walking-cultivators attached, substantially as described.

EDGAR ALFRED WRIGHT.

Witnesses:
C. K. WEVER,
B. B. HESSE.